March 8, 1966 S. C. WORDEN 3,239,239
LEVER EXTENSION FOR TRAILER FIFTH WHEEL
Filed April 2, 1964
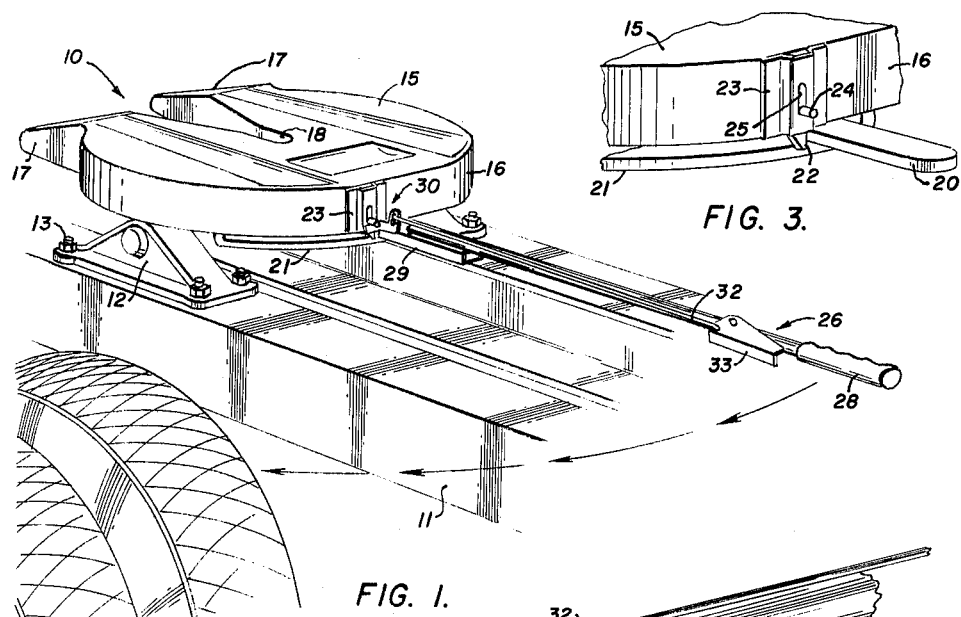
FIG. 3.
FIG. 1.
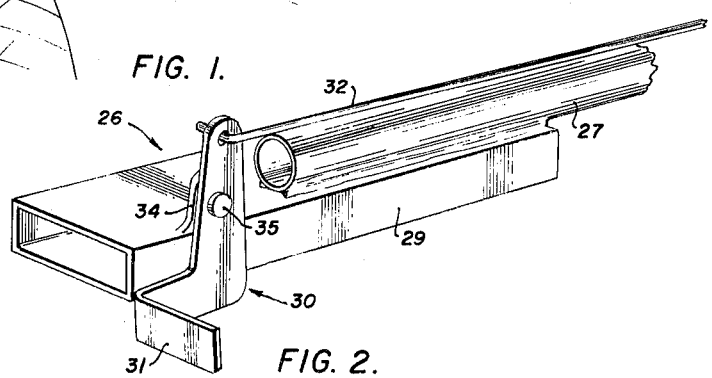
FIG. 2.
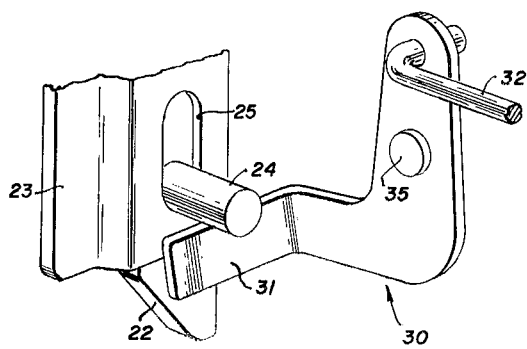
FIG. 4.
SUMMIE C. WORDEN
INVENTOR.
BY Herbert J. Brown 3,239,239
LEVER EXTENSION FOR TRAILER FIFTH WHEEL
Summie C. Worden, 2009 Salem, Irving, Tex.
Filed Apr. 2, 1964, Ser. No. 356,743
1 Claim. (Cl. 280—434)

This invention relates to coupling mechanisms for fifth wheels such as those for connecting large trailers to automotive tractors. Particularly, the invention is directed to improvements in lever extensions for operating coupling levers for engaging and disengaging king pins carried by the forward ends of the trailers. The invention is adapted for use as an accessory for that type of fifth wheel wherein there is a projecting coupling lever having a latch for securing the lever in closed or coupled position.

The coupling lever referred to is located beneath the forward end of the trailer when in its coupled position and before it is moved to its disengaged position the latch must be manually released. The latch is operated by a short projecting pin, which operation necessitates reaching between greasy and dirty parts of the tractor and trailer. Moreover, the lever of the fifth wheel is relatively short and is rather inaccessible. Because of its short length, considerable strength is required to operate the lever.

An object of the invention is to provide a lever extension for the lever referred to whereby it is made readily accessible without subjecting the operator to grease and dirt, and at the same time providing means for operating the referred to latch at a distance therefrom.

These and other objects will become apparent from the following description and the accompanying drawings, wherein:

FIGURE 1 is a perspective view of a fifth wheel mounted on the rear of an automotive tractor and showing the present lever extension applied to the fifth wheel coupling lever.

FIGURE 2 is an enlarged fragmentary perspective view of the present lever extension.

FIGURE 3 is a fragmentary perspective view of the front of the fifth wheel and showing the relation of coupling lever and the latch, and FIGURE 4 is a further enlarged perspective view of a bell crank which comprises a forward portion of the lever extension and showing the same in position for lifting the latch pin.

In the drawing, the numeral 10 generally designates a fifth wheel mounted on the frame 11 of an automotive tractor, only part of which is shown. The fifth wheel includes bolsters 12 on each side thereof which are secured to the frame 11 by bolts 13. Apart from the bolsters 12, the fifth wheel 10 shown includes a generally circular top plate 15, a depending flange 16 therearound and diverging downwardly sloped and rearwardly extending legs 17. At the center of the top plate 15 there is an opening 18 for receiving the king pin, not shown, which depends from beneath the forward center portion of the trailer.

The coupling mechanism for engaging the king pin is conventional and comprises no part of the present invention; however, the usual coupling lever 20 for operating such mechanism is shown in FIGURE 3. In its closed position the coupler lever 20 projects forwardly of the flange 16, and in its open or disengaged position it is rotated to one side in the direction shown by means of arrows in FIGURE 1.

To limit the rotation of the lever 20, and to serve as a support therefor, there is a bracket 21 beneath the forward and side lower edge of the flange 16. To secure the lever 20 in its forward locked position, there is a vertically slidable downwardly extensible latch 22 mounted in a slide 23 on the flange 16, and which latch engages the lever on the side thereof including the greater length of the bracket 21. The latch 22, which is spring loaded to urge the same downwardly, has a projecting pin 24 which, when raised, releases the lever 20. The pin 24 operates in a vertical slot 25 in the slide 23.

The present invention is directed to an extension lever, generally designated at 26, for operating the coupling lever 20 and the latch 22. The extension lever 26 includes an elongate arm 27, a hand grip 28 on the handle end of the arm and a socket 29 on the other end. The socket 29 is shaped to slidably receive the extending portion of the coupling lever 20, and there is a bell crank 30 on the socket for operating the latch 22. One arm of the bell crank 30 has a laterally projecting finger 31 positioned to lift the latch pin 24, whereas the other arm of the bell crank is pivotally connected with one end of an actuating rod 32. The other end of the rod 32 is pivotally connected with a triangular actuating lever 33 pivotally mounted on the elongate arm 27 near the hand grip 28. Any suitable means may be used for mounting the bell crank 30, but as shown in the drawing there is an upwardly projecting ear 34 carrying a laterally projecting pin 35 for that purpose.

To release the king pin (not shown) the socket 29 of the extension lever 26 is placed over the coupling lever 20. The latch 22 is released by manipulating the actuating lever 22, after which the extension lever is moved in the direction shown by arrows in FIGURE 1.

The invention is not limited to the exemplary construction herein shown and described, but may be made in various ways within the scope of the appended claim.

What is claimed is:

An extension lever for a fifth wheel having a projecting coupling lever and a latch alongside thereof, said extension lever consisting of: an elongate arm having a handle end, a socket on said arm on the end thereof opposite said handle end, a bell crank on the end of said arm including said socket and positioned to movably engage said latch when said coupling lever is received in said socket, and a rod connected at one end with said bell crank, said rod being mounted on said arm to move parallel with the length thereof to permit actuation of said bell crank and therefore operation of said latch at a distance therefrom.

References Cited by the Examiner
UNITED STATES PATENTS 2,355,042  8/1944  Billings _____ 280—434
2,581,254  1/1952  Greenawalt _____ 280—434

LEO FRIAGLIA, *Primary Examiner.*